United States Patent
Malik

(10) Patent No.: US 11,341,213 B2
(45) Date of Patent: May 24, 2022

(54) TRIAL USE OF A COLLECTION OF MEDIA FILES

(71) Applicant: AT&T INTELLECTUAL PROPERTY I, LP, Atlanta, GA (US)

(72) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1407 days.

(21) Appl. No.: 15/070,629

(22) Filed: Mar. 15, 2016

(65) Prior Publication Data

US 2016/0196413 A1 Jul. 7, 2016

Related U.S. Application Data

(63) Continuation of application No. 11/229,910, filed on Sep. 19, 2005, now Pat. No. 9,311,454.

(51) Int. Cl.
*G06F 21/10* (2013.01)
*G06F 21/62* (2013.01)
*G06Q 30/00* (2012.01)

(52) U.S. Cl.
CPC ............ *G06F 21/105* (2013.01); *G06F 21/10* (2013.01); *G06F 21/6218* (2013.01);
(Continued)

(58) Field of Classification Search
CPC .... G06F 21/105; G06F 21/6218; G06F 21/10; G06F 2221/0771; G06F 2221/2137; G06Q 30/0185
See application file for complete search history.

(56) References Cited

U.S. PATENT DOCUMENTS 6,567,107 B1 * 5/2003 Stannard ................. G06F 21/10
715/764
6,968,569 B2 11/2005 Tanaka et al.
(Continued)

FOREIGN PATENT DOCUMENTS

WO WO-0148658 A1 * 7/2001 ............. G06Q 30/06

OTHER PUBLICATIONS

"Digital Rights Management: An Integrated Secure Digital Content Distribution Technology", P Ghatak, Journal of Intellectual Property Rights, vol. 9, Jul. 2004, pp. 313-331 (Year: 2004).*
(Continued)

*Primary Examiner* — Jay Huang
*Assistant Examiner* — Duan Zhang
(74) *Attorney, Agent, or Firm* — Guntin & Gust, PLC; Douglas Schnabel

(57) ABSTRACT

Embodiments of the present disclosure provide systems and methods for sharing media files. One embodiment of the system, among others, can be implemented as follows. The system includes a file sharing application configured to initiate a communication session with a file server, where the file server that manages download requests for a collection of media files, where the collection of media files are subject to a trial period. The system further includes media file selection logic configured to prompt a user to select a subset of media files from the collection of media files that was downloaded from the file server after the trial period is detected to have expired. In accordance with this embodiment, the user selects a subset of media files that the user would like to keep for continued use and the remaining media files not selected by the user are then configured to be inaccessible by the user after the trial period has expired. Other systems and methods are also provided.

19 Claims, 10 Drawing Sheets

(52) U.S. Cl.
CPC . *G06Q 30/0185* (2013.01); *G06F 2221/0771* (2013.01); *G06F 2221/2137* (2013.01)

(56) References Cited

U.S. PATENT DOCUMENTS

| | | | |
|---|---|---|---|
| 7,249,060 B2 | 7/2007 | Ling et al. | |
| 7,403,910 B1* | 7/2008 | Hastings | G06Q 30/02 |
| | | | 705/26.1 |
| 7,702,590 B2 | 4/2010 | Malik | |
| 2002/0002541 A1* | 1/2002 | Williams | G06F 21/10 |
| | | | 705/51 |
| 2002/0007351 A1* | 1/2002 | Hillegass | G06Q 20/1235 |
| | | | 705/59 |
| 2002/0029347 A1* | 3/2002 | Edelman | G06F 21/10 |
| | | | 713/193 |
| 2002/0036800 A1* | 3/2002 | Nozaki | H04L 67/06 |
| | | | 358/1.15 |
| 2002/0059144 A1 | 5/2002 | Meffert et al. | |
| 2002/0107809 A1* | 8/2002 | Biddle | G06F 21/105 |
| | | | 705/59 |
| 2002/0111907 A1* | 8/2002 | Ling | G06Q 20/29 |
| | | | 705/41 |
| 2003/0005133 A1* | 1/2003 | Banerjee | G06Q 10/10 |
| | | | 709/229 |
| 2003/0037261 A1 | 2/2003 | Meffert et al. | |
| 2003/0177107 A1 | 9/2003 | Brown et al. | |
| 2004/0249759 A1 | 12/2004 | Higashi et al. | |
| 2005/0039034 A1* | 2/2005 | Doyle | G06F 16/24564 |
| | | | 713/193 |
| 2005/0065624 A1* | 3/2005 | Ben-Yaacov | H04N 21/435 |
| | | | 700/94 |
| 2005/0187936 A1 | 8/2005 | Homer et al. | |
| 2006/0015649 A1 | 1/2006 | Zutaut et al. | |
| 2006/0062137 A1* | 3/2006 | Ross | G11B 20/00275 |
| | | | 369/275.1 |
| 2006/0224448 A1* | 10/2006 | Herf | G06Q 30/0264 |
| | | | 705/14.61 |
| 2006/0259355 A1* | 11/2006 | Farouki | G06Q 30/02 |
| | | | 705/300 |
| 2007/0067241 A1 | 3/2007 | Malik | |
| 2008/0049971 A1 | 2/2008 | Ramos et al. | |

OTHER PUBLICATIONS

Office Action, U.S. Appl. No. 11/229,937, filed Apr. 4, 2009.
U.S. Appl. No. 11/229,897, filed Sep. 19, 2005.
U.S. Appl. No. 11/229,937, filed Sep. 19, 2005.

* cited by examiner

```
                    ┌─────────────────────────────────────────────────────────┐
                    │  IMPLEMENT A DIGITAL RIGHTS MANAGEMENT SCHEME THAT      │
                    │  ALLOWS USE OF A DIGITAL COPY OF A MEDIA WORK FOR A     │
                    │  LIMITED PERIOD THAT MAY BE STATED IN TERMS OF TIME     │
                    │  OR USE OR A COMBINATION OF BOTH TIME AND USE           │
                    │                                                    210  │
                    └─────────────────────────────────────────────────────────┘
                                              │
                                              ▼
                    ┌─────────────────────────────────────────────────────────┐
                    │  CHECK AND DETECT THAT A TRIAL PERIOD HAS ELAPSED FOR A │
                    │  PARTICULAR COPY OF A MEDIA WORK                        │
                    │                                                    220  │
                    └─────────────────────────────────────────────────────────┘
                                              │
                                              ▼
                    ┌─────────────────────────────────────────────────────────┐
                    │  OFFER A USER AN OPPORTUNITY TO PURCHASE A LICENSE FOR  │
                    │  CONTINUED USE OF THE MEDIA                             │
                    │                                                    230  │
                    └─────────────────────────────────────────────────────────┘
```

200

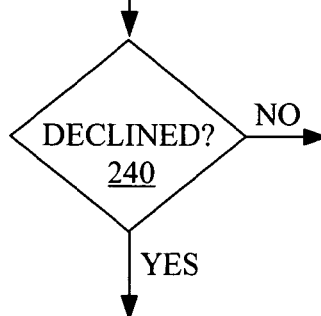

MODIFY MEDIA OR ASSOCIATED FILES TO PROHIBIT PLAYBACK OF MEDIA  250

FIG. 2

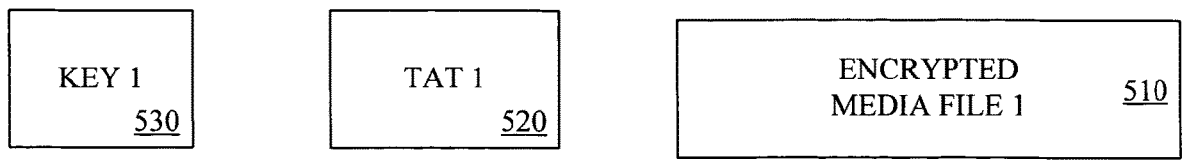
FIG. 5
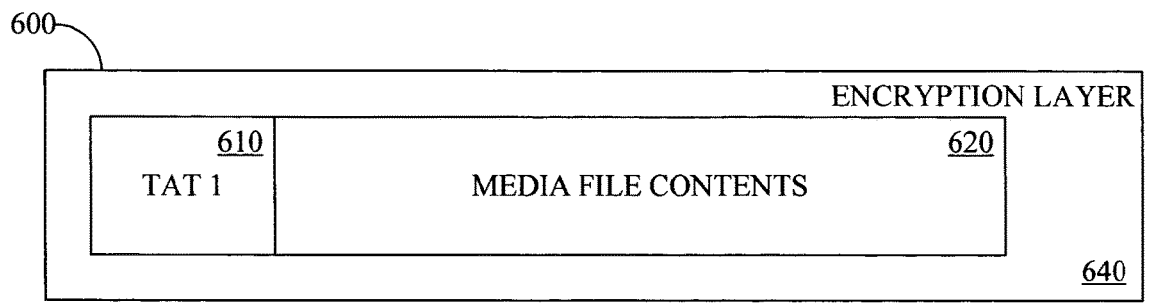
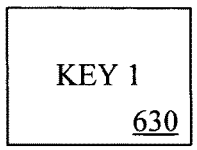
FIG. 6
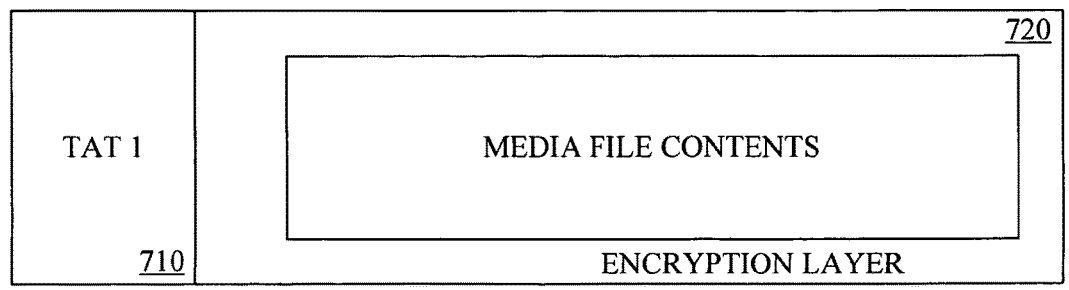
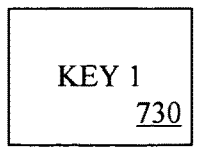
FIG. 7

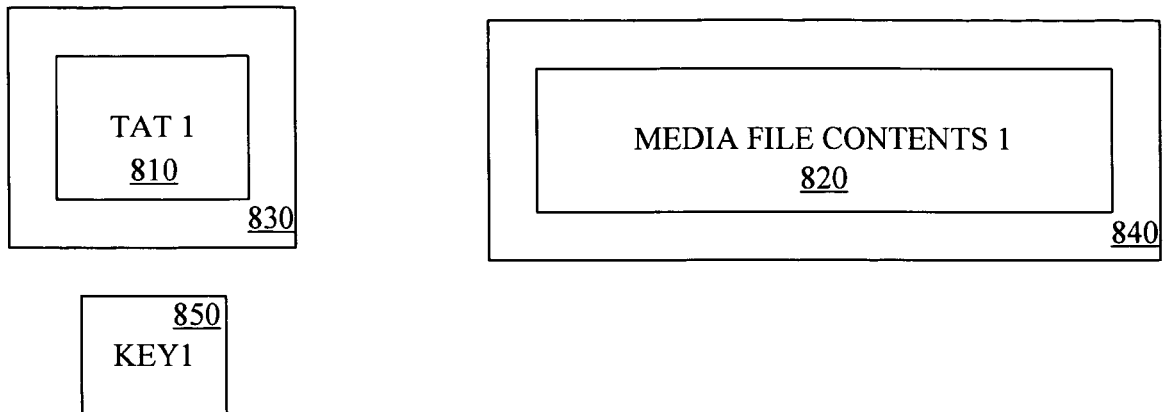
FIG. 8
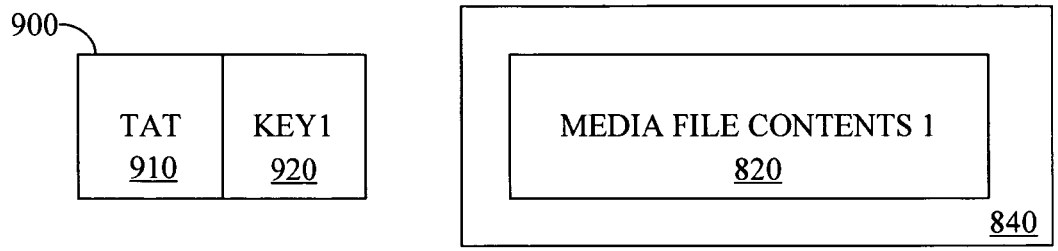
FIG. 9A
| MEDIA FILE 1 | TAT 1 | USAGE DATA 1 |
| MEDIA FILE 2 | TAT 2 | USAGE DATA 2 |
| MEDIA FILE 3 | TAT 3 | USAGE DATA 3 |
| MEDIA FILE 4 | TAT 4 | USAGE DATA 4 |
| MEDIA FILE 5 | TAT 5 | USAGE DATA 5 |
FIG. 9B

ALERT: 1100

THE MEDIA FILE YOU HAVE REQUESTED TO PLAY IS SUBJECT TO A TRIAL PERIOD THAT HAS EXPIRED. THEREFORE, YOU ARE NOT CURRENTLY AUTHORIZED TO ACCESS THE CONTENT OF THE MEDIA FILE.

IF YOU WOULD LIKE TO PLAY THE MEDIA FILE, PLEASE SELECT ONE OF THE OPTIONS BELOW AND SUBMIT THE REQUEST IN ORDER TO BE GRANTED A LICENSE FOR CONTINUED USE AND PLAYBACK OF THE MEDIA.

○ OPTION 1: OBTAIN A LICENSE FOR UNLIMITED USE AND PLAYBACK OF THE MEDIA 1110

○ OPTION 2: OBTAIN A LICENSE FOR LIMITED USE AND PLAYBACK OF THE MEDIA 1120

| SUBMIT REQUEST AND CONNECT TO MEDIA SERVER | MAKE REQUEST AT ANOTHER TIME 1130 |

FIG. 11

TRIAL USE OF A COLLECTION OF MEDIA FILES

CROSS-REFERENCE TO RELATED APPLICATIONS

This application is a continuation of and claims priority to U.S. patent application Ser. No. 11/229,910 filed Sep. 19, 2005. The contents of the foregoing is hereby incorporated by reference into this application as if set forth herein in full.

FIELD OF THE DISCLOSURE

The present disclosure is generally related to digital media files and, more particularly, is related to access management for digital media files.

BACKGROUND OF THE DISCLOSURE

An owner of a media file is often concerned with managing use of a digital copy of the media file and controlling who is authorized to have and use a copy of the media file. This problem is particularly pervasive in the music industry. Unless some type of protection scheme is used, it is often easy for a quality copy of digital music to be reproduced and for unauthorized use of the work to occur. Thus, many music sharing services, which enable users to download copies of musical works or other media recordings, require a user to purchase a license to use a copy of the digital music from the owner of the musical work before the service transfers a copy of the digital music file to a user. Further, some music sharing services require a user to subscribe to a monthly plan for receiving and using digital music. If the user cancels the subscription, however, the user is unable to play previously downloaded music. Such services, however, do not authorize a user to test or try digital music for a limited time, on a case by case basis, without a fee being initially associated with the music.

Thus, a heretofore unaddressed need exists in the industry to address the aforementioned deficiencies and inadequacies.

SUMMARY

Embodiments of the present disclosure provide systems and methods for sharing media files. Briefly described, in architecture, one embodiment of the system, among others, can be implemented as follows. The system includes a file sharing application configured to initiate a communication session with a file server, where the file server that manages download requests for a collection of media files, where the collection of media files are subject to a trial period. The system further includes media file selection logic configured to prompt a user to select a subset of media files from the collection of media files that was downloaded from the file server after the trial period is detected to have expired. In accordance with this embodiment, the user selects a subset of media files that the user would like to keep for continued use and the remaining media files not selected by the user are then configured to be inaccessible by the user after the trial period has expired.

Embodiments of the present disclosure can also be viewed as providing methods for sharing media files. In this regard, one embodiment of such a method, among others, can be broadly summarized by the following steps: downloading a collection of media files, the collection of media files subject to a trial period; detecting expiration of the trial period; prompting a user to select a subset of media files from the collection of media files after detection of the expired trial period; enabling the selecting media files for continued use by the user; and disabling remaining media files from the collection, such the user is unable to access the remaining media files.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a flowchart describing one embodiment, among others, of an approach for purchasing a license for use of a media file after a trial period has elapsed in accordance with the system of FIG. 1.

FIGS. 5-9B are diagrams illustrating various schemes, among others, for formatting media file contents and associated encryption/decryption key and trial access terms in accordance with the system of FIG. 1.

FIG. 11 is diagram of an embodiment of a screen interface for notify a user of an expired trial period in accordance with the system of FIG. 1.

This application is related to co-pending U.S. utility patent application entitled "Trial Access Terms for Media Files" filed on Sep. 19, 2005 and accorded U.S. application Ser. No. 11/229,937, by Dale Malik and co-pending U.S. utility patent application entitled "Trial Access for Media Files from a Song List" filed on Sep. 19, 2005 and accorded U.S. application Ser. No. 11/229,897, by Dale Malik, both of which are incorporated herein by reference in their entirety.

DETAILED DESCRIPTION OF THE DRAWINGS

Figure 1:
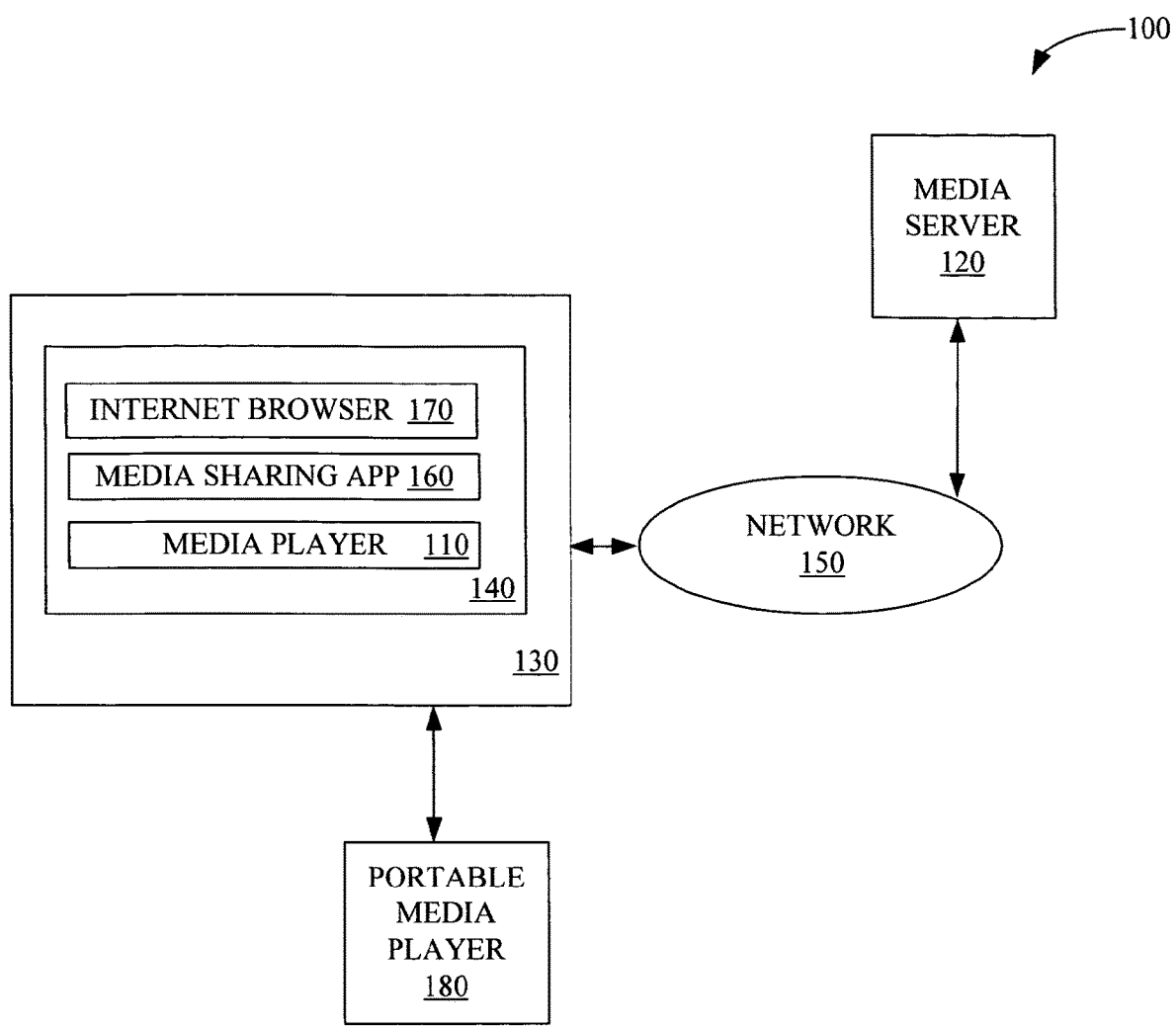
FIG. 1 is a block diagram illustrating a system for purchasing digital copies of a media work, or other content recorded in a digital media file according to the present disclosure.

FIG. 1 is a block diagram 100 that illustrates a system for purchasing digital copies of a media work, or other content recorded in a digital media file, to users according to various embodiments described herein. Examples of digital media files encompass a variety of file formats or media, and the present disclosure is not necessarily limited to any particular type of digital format. For example, media files may include but are not limited to sound files, video files, and audio-video files.

According to one embodiment, as demonstrated in FIG. 1, a user operates a media player application 110, in which the media player application 110 plays digital media files. The media files are transferred from a remote file server that has access to a database storing an assortment of media files. The remote file server may be referred to as a media server 120.

The media player application 110 is a software application stored in memory 140 of a general-purpose computer 130, and the general-purpose computer 130 communicates with the media server 120 via a communication network 150, such as, but not limited to, the Internet. A communication network 150 in accordance with the present disclosure may encompass a variety of types of networks that enable a media sharing application 160 to communicate with the media server 120. As such, the general-purpose computer 130 or other communication device may utilize wireless communication or wireline communication techniques.

In addition, a media sharing application 160 resides in memory of the general-purpose computer device 130. The media sharing application 160 communicates with the media server 120 and facilitates retrieval of copies of digital media files from the media server 120. Further, the media sharing application 160 is configured to organize locally stored digital media files (e.g., via arrangement of local media libraries) on the general-purpose computer 130 and may also set information associated with a log-in account for the media server 120 and/or information associated with downloaded media files. In some embodiments, a single application performs the functionality of the media sharing application 160 and media player application 110.

Note, the media sharing application 160 may be a web page or an Internet-based application that is launched by an Internet browser application 170. In some embodiments, the media sharing application 160 displays to a user different options for browsing available media files and requesting a copy of the media file to be transferred from the media server 120 to the general-purpose computer 130. One embodiment for requesting a media file from media server 120, in accordance with the present disclosure, involves downloading a copy of a digital media file that may be used during a trial period. After which, the media file may not be authorized to be used.

In some embodiments, a personal or portable computing device 180 may also be associated with a general-purpose computer 130 or communication device that receives media files from the media server 120. The portable computing device 180 is equipped to store media files and to play contents of the media files. For example, a user may download a media file from the media server 120 to a general-purpose computer 130. Then, the general-purpose computer 130 transfers the downloaded media file to the portable computing device 180 via a data link between the general-purpose computer 130 and the portable computing device 180 (e.g., a universal serial bus (USB) data connection). Along with the transferred media file, additional information is transferred that is necessary to play the transferred media file, such as an encryption/decryption key for removing an encryption layer protecting the media file and trial access terms that express the trial period for the media file. In particular, the encryption/decryption key is used to encrypt contents of a file before it is transferred by the media server 120 and to decrypt the contents of the media file before it is played by a media player application 110 or accessed by some other computer application. Generally, the trial access terms include parameters defining the trial period for a particular media file. The trial access terms may be organized utilizing different fields within a data structure. These parameters, in some embodiments, may express the trial period in positive terms or negative terms. The trial access terms may be embodied in a variety of forms. Some of which is discussed hereinafter.

The portable computing device 180 also features a media player application for playing media files stored on the portable computing device 180. The media player application for the portable computing device 180 may be referred as a portable media player application (not shown).

One embodiment of an approach for purchasing a license for use of a media file is now described with reference to a flowchart diagram 200 of FIG. 2. In step 210, a digital rights management (DRM) scheme is implemented that authorizes use of a digital copy of a media work for a limited period that may be stated in terms of time or usage or a combination of both time and usage. After the trial period ends, a designated event triggers an offer to be made to a user to purchase a license for continued use of the digital copy of the media work. If the user buys a license, then the user is authorized to use the media work in accordance with the terms of the purchased license. If the user declines to buy a license, the user is prohibited from using the copy of the media work, since the trial period has expired. The designated event that triggers the offer process may be a different event in different embodiments.

Referring back to FIG. 2, a trial period is checked and detected (220) to have expired for a particular copy of a media work (e.g., "song") by a media sharing application. For instance, in some embodiments, a media sharing application 160 checks the trial periods of media located on a general-purpose computer 130 upon activation of the media sharing application. In some other embodiments, the media sharing application 160 may also check the trial periods of media located on a general-purpose computer 130, whenever the media sharing application logs into a session with a media server 120. Further, in some embodiments, the media sharing application 160 checks the trial periods of media files stored on the portable computing device 180 when the media sharing application 160 detects that the portable computing device 180 has been connected to the general-purpose computer 130 with the media sharing application 160.

After the media sharing application detects an expired trial period, the media sharing application 160 offers (230) a user an opportunity to purchase a license for continued use of the media. The media sharing application 160 may have prestored information for making an offer that was previously received by the media server 120. Further, this information may be updated in a periodic basis with the media server 120. Alternatively, in some embodiments, the media sharing application 160 may receive information from the media server 120 for making an offer to the user after detection that use of the media has expired in accordance with terms defining authorized use of the media during the trial period. These terms may be referred to as trial access terms.

In addition to presenting an offer or a variety of offers for purchasing a license for use of a media contained in a media file, the media sharing application 160 also provides interface options for accepting and providing additional information for purchasing the license or alternatively, for declining the offer(s). If a license is purchased for continued use, the DRM scheme protecting the media work is modified to authorize the user to use the media in accordance with the terms of his or her new license. For example, if the DRM scheme indicates a limited use associated with a media file by having a header portion of the media file containing trial access terms that define what uses of the media file are authorized or not authorized, this header portion may be modified by a computer application on the general-purpose computer 130 or on the media server 140 to contain new trial access terms that correspond to a newly purchased license agreement. In embodiments where a separate file or data structure is used to specify trial access terms of a particular media work, this separate data structure may be modified by a computer application on the general-purpose computer 130 to contain new trial access terms that correspond to a newly purchased license.

Referring back to FIG. 2, if the offer is declined (240) by a user, the media and/or associated files (that help implement the DRM protection scheme) are modified (250) and/or deleted to prohibit the user from playing the media. For example, in some embodiments an encryption/decryption key is provided to a computer application, so that the computer application may access a media file that is protected by an encryption layer. To decrypt the encryption layer, the encryption/decryption key is utilized. However, if a computer application is instructed to delete the encryption/decryption key because use of a media file is no longer authorized in accordance with a trial access terms, then contents of the media file is unable to be accessed by the computer application. Alternatively, the media file itself may be deleted, in some embodiments, by a computer application after a trial period for the media file has expired. If the offer is accepted, then the media and/or associated files are modified to enable the user to have continued access to the contents of the media.

The particular event that triggers a license offering process may be different for different implementations of the media sharing services. For example, in the case where a user utilizes a general-purpose computer 130 to play media files downloaded from a media server 120, the activation of the media sharing application 160 may launch a process for checking locally stored media files for expired trial periods. Alternatively or in addition, the logging into a media server 120 by a media sharing application 160 may also trigger a process, in the general-purpose computer 130, for checking locally stored media files for expired trial periods.

Next, a variety of approaches are discussed with regard to checking for a trial period associated with a media file. In particular, when the media player application 110 receives a request to play a particular media file stored on the general-purpose computer 130, the media player application 110, in some embodiments, checks for trial access terms associated with a particular media file. In some embodiments, the trial access terms may be included in a header to the media file itself. For example, the media server 120 may configure trial access terms within a header of the media file before transferring the media file to a general-purpose computer 130 or other computing device.

Therefore, after a media file is received from the media server 120, the media file is decrypted by the media player application 110 using an encryption/decryption key associated with the media file. After the file is decrypted and the contents of the file are accessible, then the trial access terms are obtained from a header of the media file. The trial access terms are then checked by the media player application 110 and/or media sharing application 160 to determine whether trial access terms authorize continued use of media file. To do so, usage data or timing information is evaluated by the media player application 110. For example, if the trial access terms authorize a particular media file to be played a maximum of 5 times, the amount of times the particular media file has already been played is maintained as usage data by a media player application 110 and the usage data is evaluated when the media player application receives a new request to play the media file. Correspondingly, if trial access terms for a particular media file authorizes the media file to be played for a period of one month, then the time at which the media file was first accessed may also be stored as usage data and compared with current timing information when a new request for playback of the media file is received by a media player application 110.

Further, if trial access terms indicate that a particular media file may be played 5 times in one month's time, then the media player application 110 maintains a record of the number of times that a media file has been previously played and also records or maintains the date that the media file was first played, so that the media player application 110 may calculate the length of time that has transpired since the first use of the media file. The usage data, in some embodiments, is recorded in updateable field(s) within the data structure containing the trial access terms, which may be part of the media file. Therefore, in some embodiments, the updateable fields and other trial access term information is transferable with the media content information in a single file. An advantage of keeping the trial access terms and usage data together with the media contents in a single file is that any media player or computer application, in general, that attempts to access the file has access to all of these components to determine whether a trial period has expired for a media file.

Alternatively, in some embodiments, the usage data is stored separately from the media file and/or trial access terms. For example, the usage data may be recorded as distinct files for each media file, in some embodiments. Alternatively, in other embodiments, usage data for a variety of media files may be stored in one file (by a media player application 110 or other application), such as a table having different entries for different media files.

Figure 3:
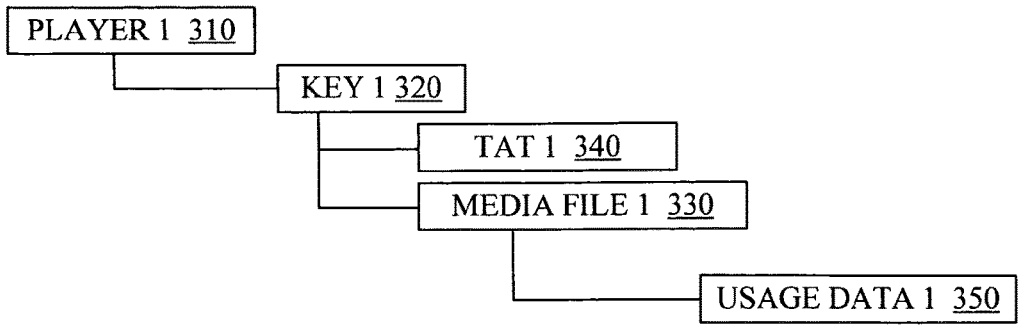
FIG. 3 is a diagram demonstrating one scheme, among others, of associating usage data with media files and other related information in accordance with the system of FIG. 1.

For example, FIG. 3 demonstrates one way, among others, of associating usage data with media files and other related information. For instance, in FIG. 3, a particular media player ("PLAYER 1") 310 is associated with a particular encryption (or decryption) key ("KEY 1") 320. Therefore, media files transferred to a general-purpose computer 130 or other computing device housing the media player application 310 are encrypted and decrypted using the encryption/decryption key associated with the media player application 310, in some embodiments. In particular, the media server 120 assigns an encryption/decryption key to the general-purpose computer, in some embodiments and passes a copy of the key to the general-purpose computer. Therefore, when the media server 120 encrypts a media file using the encryption/decryption key, the media player 310 on the general-purpose computer utilizes the key to decrypt the media file.

As represented in FIG. 3, a particular media file ("MEDIA FLE 1") 330 is also associated with the encryption/decryption key ("KEY 1") 320, since the media file is encrypted using the particular encryption/decryption key 320. Thus, a media server 120, for example, may assign a particular encryption/decryption key to a particular computer or communication device that requests a media file from the media server 120, and before transferring the media file (or as part of the transferal process), the media server 120 encrypts the media file using the encryption/decryption key. Accordingly, the encryption/decryption key is passed to the computer or communication device housing the media player application, so that the media player application located on the computer or communication device can use the encryption/decryption key to decrypt the media file to access the contents of the media file.

Correspondingly, any potential information that is transferred from the media server 120 to a computer or communication device may be encrypted using the encryption/decryption key associated with the computer or communication device receiving the information. As such, trial access terms 340 that are associated with a particular media file may also be encrypted using the encryption/decryption key, as represented in FIG. 3.

To gauge whether trial access terms 340 of a particular media file authorize continued use of a particular media file, usage data 350 is maintained for each media file, as represented in FIG. 3. By comparing the usage data that reflects the types of use a media file has experienced with the trial access terms that describe the types of uses authorized for the media file, a media player application 310 or other device can determine whether continued use of the media file is available or whether the trial period for using the media file, in accordance with the trial access terms 140, has expired.

Figure 4:
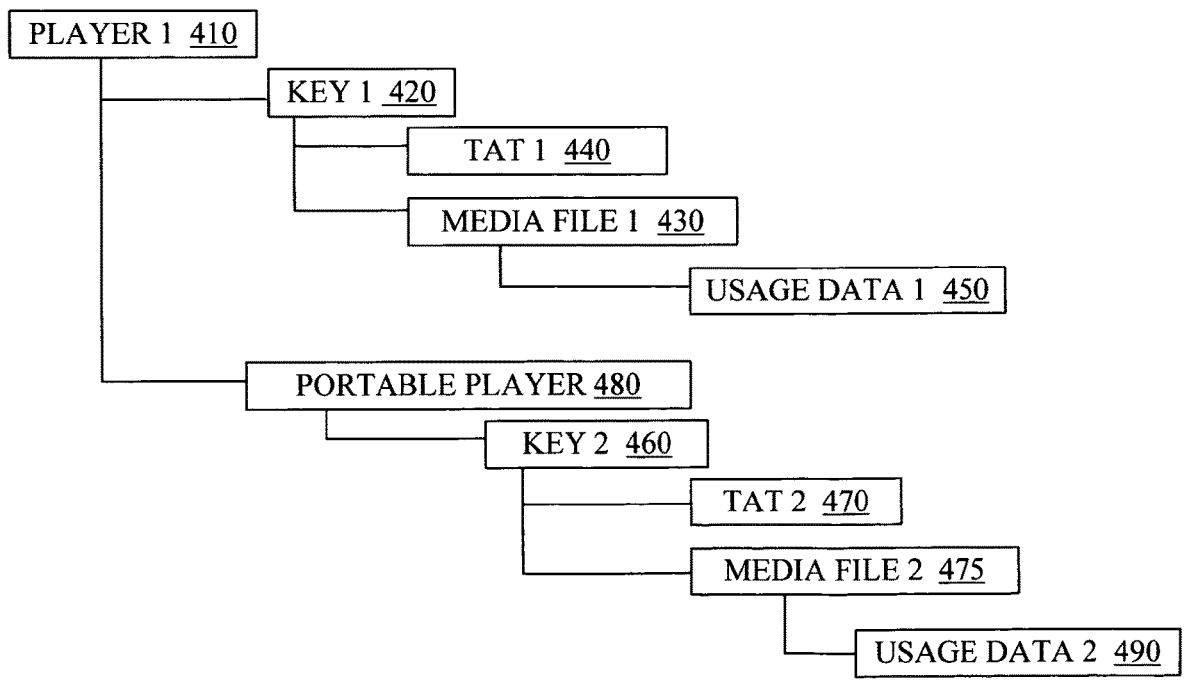
FIG. 4 is a diagram illustrating one scheme, among others, for associating encryption/decryption keys and other related information to media devices in accordance with the system of FIG. 1.

In one embodiment, among others, as shown in FIG. 4, distinct encryption/decryption keys are assigned for the respective devices. One distinct encryption/decryption key 420 is assigned to the general-purpose computer having a media player application or device 410 and one distinct encryption/decryption key 460 is assigned to a portable computing device 480 with a portable media player application. This assures that the encrypted media files stored on a particular device are configured to be accessed by a single device having the encryption/decryption key associated with the appropriate media file. Therefore, a user may register a general-purpose computer 130 with logic of the media server 120 in addition to a portable computing device 180, and logic of the media server 120 may assign one unique encryption/decryption key to the general-purpose computer 130 and another unique encryption/decryption key to the portable computing device 180. The general-purpose computer 130 may pass the encryption/decryption key for the portable computing device 180 to the portable media player 180 from the media server 130.

Therefore, the media player application (PLAYER 1) 410 is associated with an encryption/decryption key (KEY 1) 420 which is associated with trial access terms (TAT 1) 440 and a media file (MEDIA FILE 1) 430 and usage data (USAGE DATA 1) 450 that tracks how the media file has been used. Correspondingly, a portable computing device (PLAYER 2) 480 is associated with the general-purpose computer 130. Further, the portable computing device (PLAYER 2) 480 is associated with another encryption/decryption key (KEY 2) 460 which is associated with a set of trial access terms (TAT 2) 470 and a media file (MEDIA FILE 2) 485 and usage data (USAGE DATA 2) 490 that tracks how the media file has been used, in one embodiment.

As another example, FIG. 5 demonstrates one scheme, among others, for formatting a media file and associated files. For example, in FIG. 5, an encrypted media file 510 is shown. The encryption/decryption key 520 associated with the encrypted media file 510 is also shown and stored in the computer or communication device, where the media file 510 is located. Trial access terms (TAT) 530 are also stored in a separate file that may not be encrypted. Each of these files is accessible by a computer application that manages media files for a user or attempts to access media files for a user. Accordingly, a computer application that receives a request from a user to access contents of a media file may evaluate associated trial access terms to determine if the user is authorized to access the media file.

Correspondingly, FIG. 6 demonstrates another scheme for formatting media file contents and associated encryption/decryption key and trial access terms. In this example, the trial access terms 610 are included in a file structure with the media file contents 620, and the whole file is then encrypted with an encryption layer 640 using a unique encryption/decryption key 630. To access the contents of the trial access terms 610 and media file contents 620, the encryption/decryption key 610 is used by a computer application to decrypt the encryption layer 640 that is protecting the media file 600.

As another example, FIG. 7 demonstrates another scheme for formatting a media file and associated data structures. In this embodiment, trial access terms 710 may be added as a separate part of a file structure containing an encrypted media file 720, as shown in FIG. 7. In this way, the portion of the file structure containing the trial access terms 710 may be accessible without an encryption/decryption key. However, to access the contents of the media file 720, an encryption/decryption key 730 is used.

Alternatively, FIG. 8 demonstrates another scheme where the trial access terms 810 and the media file contents 820 are organized in separate data structures or files. Each structure is encrypted and protected by an encryption layer 830, 840 using an encryption/decryption key 850. Further, in FIG. 9A, a scheme is shown where the trial access terms 910 are included in a file or data structure 920 that also contains the encryption/decryption key 930 for an associated media file. This data structure may be organized as a table. Further, in some embodiments, a single table structure 950 may hold usage data and key information for more than one media file, as shown in FIG. 9B.

Figure 10:
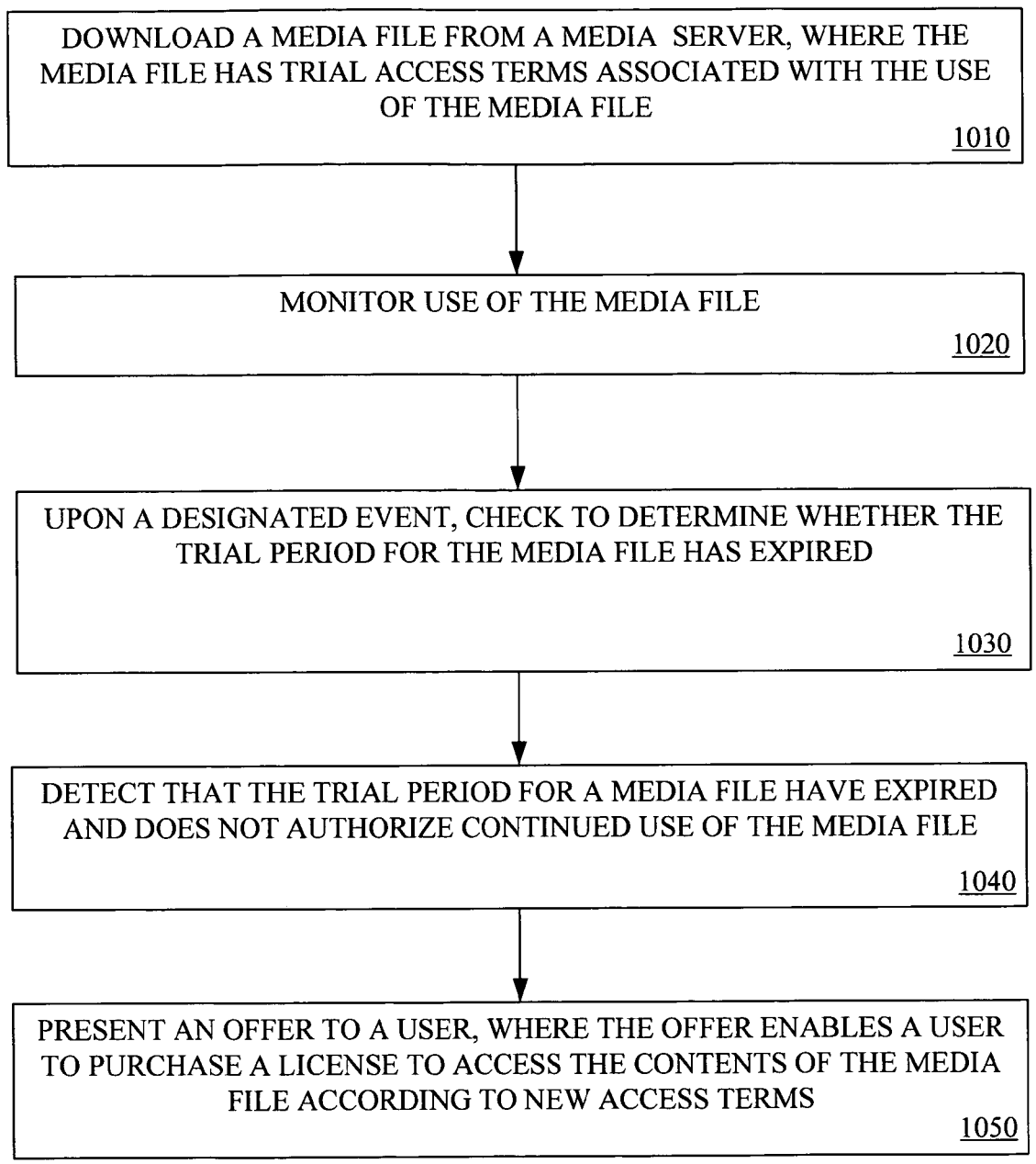
FIG. 10 is a flowchart describing one embodiment, among others, of a method for managing access to digital media files in accordance with the system of FIG. 1.

In accordance with the present disclosure, one embodiment, among others, of a method for managing access to digital media files is shown in the flowchart of FIG. 10. First, in FIG. 10, a user downloads (1010) a media file from a media server 160, where the media file has trial access terms associated with the use of the media file. The trial access terms are received from the media server 160 and may be included as part of the data structure containing the media file.

Accordingly, the media file and trial access terms are transferred to a computer device 130 having a computer application (e.g., media player application 110, media sharing application 160, etc.) for accessing the contents of the media file. The computer application also monitors (1020) use of the media file and tracks the use of the media file as usage data. Upon a designated event, the computer application checks (1030) whether the trial period, as express by the trial access terms, for the media file has expired. If the computer application detects (1040) that the trial period for a media file has expired and does not authorize continued use of the media file, the computer application presents (1050) an offer to a user, where the offer enables a user to purchase a license to access the contents of the media file according to new access terms. Many of these steps are discussed in further detail hereinafter.

With regard to a checking process (1030), a media player application 110 or portable computing device 180 (with a portable media player application) may check the trial period for a particular media file in a variety of different ways in a variety of different embodiments. For example, in some embodiments, a checking process (where the trial period is checked) may be performed after each playback request of a particular media file by a media player device 110, 180. If the trial period is detected to have expired, some embodiments authorize the contents of the media file to be accessed at this time and/or notify a user of the expired status of the media file.

In some embodiments, a checking process may be performed periodically by a computer application (e.g., media player application 110, portable media player application, media sharing application 160) for all or a subset of the media files stored on a device. Also, in some embodiments, a checking process may be performed upon startup of a device 130, 180 associated with a media player application 110 and/or media sharing application 160 or upon a shutdown of the device 130, 180.

Further, in some embodiments, the checking operation is initiated upon detection of a designated event. For example, if a computer application on a general-purpose computer 130 associated with the media sharing application 160 detects that a portable computing device 180 has plugged into the computer device 130, the media sharing application 160 may then automatically check the status of the media files located on the portable computing device 180. Correspondingly, a checking operation may also be performed upon the logging in of a user with the media server 120, where the check operation is performed for media files that are accessible by the media sharing application 160. In accordance with the present disclosure, one or a combination of different checking operations may be performed in various embodiments.

If a media player application 110 or portable computing device 180 checks the trial access terms of a particular media file or collection of media files and further detects that the trial period has expired for one or more media files, a variety of actions may result in a variety of embodiments. For example, upon detection, a media player application 110 may immediately prohibit playback of a media file until a user obtains the right for continued use of the media file. Further, upon detection, a media player device 110, 180 and/or a media sharing application 160 may notify the user that the trial access terms for the media file do not authorize playback of the contents of the media file. This notification may be done visually by displaying a message or icon on a general-purpose computer 130 or portable computing device 180 and/or may be done by playing an audio alert or message by the general-purpose computer 130 or portable computing device 180. Further, in some embodiments, a media player application 110, 180 and/or media sharing application 160 may internally record that a trial period has expired for a particular media file but also authorize continued use of the media file without immediate notification to the user. Upon a designated event (such as a log-in to the media server 120), however, the user is notified of the expired trial period and is prompted to purchase a new licensing agreement for continued use of the media file, in some embodiments.

In addition, some embodiments employ digital tokens that may be allocated and distributed from the media server 120 to a media player device 110, 180. For example, a user may purchase a quantity of digital tokens (e.g., 20) for a particular media player device (e.g., media player application on a general-purpose computer, a media player application on a portable computing device, etc.) and after expiration of trial access terms for a media file attempting to be accessed by the media player device, the media player device 1110, 180 may exchange a set of the digital tokens allocated for the device for continued use of the media file. With this approach, a header of the media file may identify the number of digital tokens required for continued use of the media file. Further, different levels of use of the media file may be specified in the media file header (as part of or in addition to the trial access terms). For instance, with an exchange of 3 digital tokens, a single playback of the media file may be authorized. Further, with an exchange of 10 digital tokens, a license may be purchased for repeated use of the media file. Then, when the media player device subsequently establishes communication with the media server 120 (whether direct communication or indirect communication via a general-purpose computer), the quantity of tokens remaining on the media player device 110, 180 is checked and the user may be offered an opportunity to purchase additional digital tokens.

After detection of an expired trial period of a media file as defined by the trial access terms for the media file, a user is presented with an offer to extend usage of the media file. The time at which an offer is presented to a user may vary for different embodiments. For example, in one embodiment, when a media player application 110, media sharing application 160, or other computer application detects that a user is not authorized to access the contents of a media file, the media player application 110, 180, media sharing application 160, etc. promptly presents the user an offer to purchase a license for continued use of the media file. For example, in some embodiments, the media player application 110 displays a notification on the general-purpose computer 130 inviting the user to purchase a license for continued use of the media file. This license may be of varying scope. For example, it may be a new license that provides limited use of the media file for a number of plays and/or a length of time. Alternatively, the license may provide unlimited use of the media file with regard to time and number of plays and other potential restrictions. The offer displayed by the media player application/device 110 may provide a button or link that may be activated by the user such that the general-purpose computer 130 attempts to log into the media server 120 to complete terms of the license agreement, to set up financial terms; and/or transfer any necessary information between the media server 120 and the general-purpose computer 130 (via a media sharing application 160, for example). In some embodiments, a group of offers are presented to a user, where respective offers may provide varying scopes of use for varying prices. Also, in some embodiments, an offer presented to a user may include the option of acquiring a quantity of digital tokens that can be used in exchanged for continued use of media files, where different price plans provide for different quantities of digital tokens to be purchased.

As an illustrative example, FIG. 11 displays a sample interface 1100 that may be shown to a user after a trial period has expired for a media file, and the user has requested access to the media file. In this example, a user has the options of selecting to obtain a license for unlimited use of the media file 1110; selecting to obtain a license for limited use of the media file 1120; or foregoing the opportunity to obtain a license at this time by selecting the Make Request at Another Time button 1130.

In some embodiments, a portable computing device 180 with a portable media player application may be limited in size and feature a limited number of user interface options, and thus is not capable of displaying or presenting an offer to a user when trial access terms for a media file have been determined to have expired. Thus, the portable computing device 180 may note (e.g., set an internal flag) or record that use of the media file has expired, so that when the portable device 180 is connected to a general-purpose computer 130, a computer application on the general-purpose computer 130 can check for expired trial periods on the portable computing device 180 and present an offer to the user at that time, if expired trial periods are detected. Alternatively, in embodiments where the portable computing device 180 is capable of displaying an offer for a license, the portable computing device 180 may present the offer to the user with instructions for responding to the offer, such as connecting the portable computing device 180 with the general-purpose computer 130 which is also capable of connecting to the media server 120.

For example, the media sharing application 160 may be configured to detect that a portable computing device 180 has connected to the general-purpose computer 130. After detection, the media sharing application institutes a routine that checks for expired trial periods associated with media files on the portable computing device 180. If an expired trial period is detected, then the media sharing application 160 presents an offer to the user for purchasing a new license for continued use of the media file or else the media file will be deleted or locked to further access.

Alternatively, in some embodiments, after a user logs into the media server 120 via the general-purpose computer 130, the media server 120 accesses contents of the portable computing device 180 if it is also connected to the general-purpose computer 130. Thus, the media server 120 checks and detects whether the portable computing device has 180 media files with expired trial periods. In addition, the media server 120 checks and detects whether the general-purpose computer 130 has media files with expired trial periods. Further, the media server 120 is able to, upon detection, transfer offer materials to the general-purpose computer 130 that is displayed via the media sharing application 160 for media files that are located on the portable computing device 180 and/or the general-purpose computer 130.

Also, in some embodiments, the offer is presented upon a designated event, such as logging into the media server 120. For example, to make the offer to the user, a general-purpose computer 130 may download an offer from the media server 120 or associated network server. Thus, an offer is made to the user, after the user has established a connection between the media server 120 and the general-purpose computer 130 and retrieved offer materials.

In other embodiments, offer materials may be prestored in the storage area of a general-purpose computer 130 housing the media player application 110 and/or media sharing application 160. Thus, the general-purpose computer 130 utilizes the prestored material to present an offer to a user for accepting a new license agreement.

However, at some point in time, the general-purpose computer 130 connects to an external server to transmit the offer and associated information (e.g., name of user, credit card number, agreement form, etc.) to the operator of the media server 120 or other entity authorized to transfer licenses on behalf of the owner of the contents of the media file.

In the case where a user utilizes a portable media player 180 to play media files received from a general-purpose computer 130 that previously downloaded media files from the media server 180, many different scenarios exist for triggering the license offering process. For example, consider a scenario where the portable computing device 180 locally stores one set or library of media files that are not the same as a second set or library of media files stored on the general-purpose computer 130. In this scenario, a user can manage each respective library independently from the other.

In this case, the event that triggers a license offering process may involve one particular event for the general-purpose computer 130 and another event for the portable computing device 180. Therefore, for the general-purpose computer 130, an event for checking the media files stored locally on the general-purpose computer 130 may involve the activation of the media sharing application 160 (e.g., upon launching the media sharing application 160). Alternatively, an event for checking media files stored locally on the general-purpose computer 130 may involve a different event of logging into the media server 120, as previously explained.

With regard to the portable computing device 180, the media sharing application 110 checks the contents of the portable computing device 180 when the portable computing device 180 is hooked up or connected to the general-purpose computer 130. Therefore, the event for checking media files stored on the portable computing device 180 involves the detection of the portable computing device 180 being connected to the general-purpose computer 130 (e.g., automatic plug and play detection).

With regard to a different scenario where the portable media player 180 locally stores one set of library media files that are intended to match the set of library media files stored on the general-purpose computer 130, a single event may be used to trigger the license offering process with regard to both devices. In this type of scenario, the contents of a media player application 110 located on the general-purpose computer 130 are synched up with contents of a portable media player 180 that is connected to the general-purpose computer 130 (or vice-versa). In this way, the contents of the portable computing device 180 is made to be identically or substantially identical to the contents of the media player application 110 on the general-purpose computer 130, including media track information, playlists, and usage data. Accordingly, to keep up with usage data, the current usage data maintained by the media player application 110 on the general-purpose computer 130 and the portable media player 180 is compared with the previous usage data that was recorded for a previous "synch" operation.

For example, if at a previous synch operation, the usage was recorded to be 2 for a particular media (e.g., a song has been played 2 times between the media player application 110 on the general-purpose computer 130 and the portable computing device 180) and currently the version of the media on the media player application 110 on the computer 130 has a usage amount of 6 and the version of the media on the portable media player 180 has a usage amount of 9 at the time of the new synch operation, then the usage amount for the media for both the media player application 110 on the computer and the portable media player 180 is updated to 11.

In particular, if the media player application 110 on the general-purpose computer 130 has played the media 4 additional times, since the last synch operation (where the usage amount was previously 2) and the portable media player 180 has played the media 7 additional times, since the last synch operation (when usage amount was previously 2) on the portable media player 180, then the new usage amount is the previous usage amount (which was 2) plus the additional usage amounts for each device (which is 2+7=9) for a total usage amount of 11 (i.e., 2+9). Therefore, after the new synch operation, the usage amount is 11 for both the portable computing device 180 and the media player application 110 on the general-purpose computer 130 (until one of the devices uses the media for an additional time, before another synch operation is performed).

Figure 12:
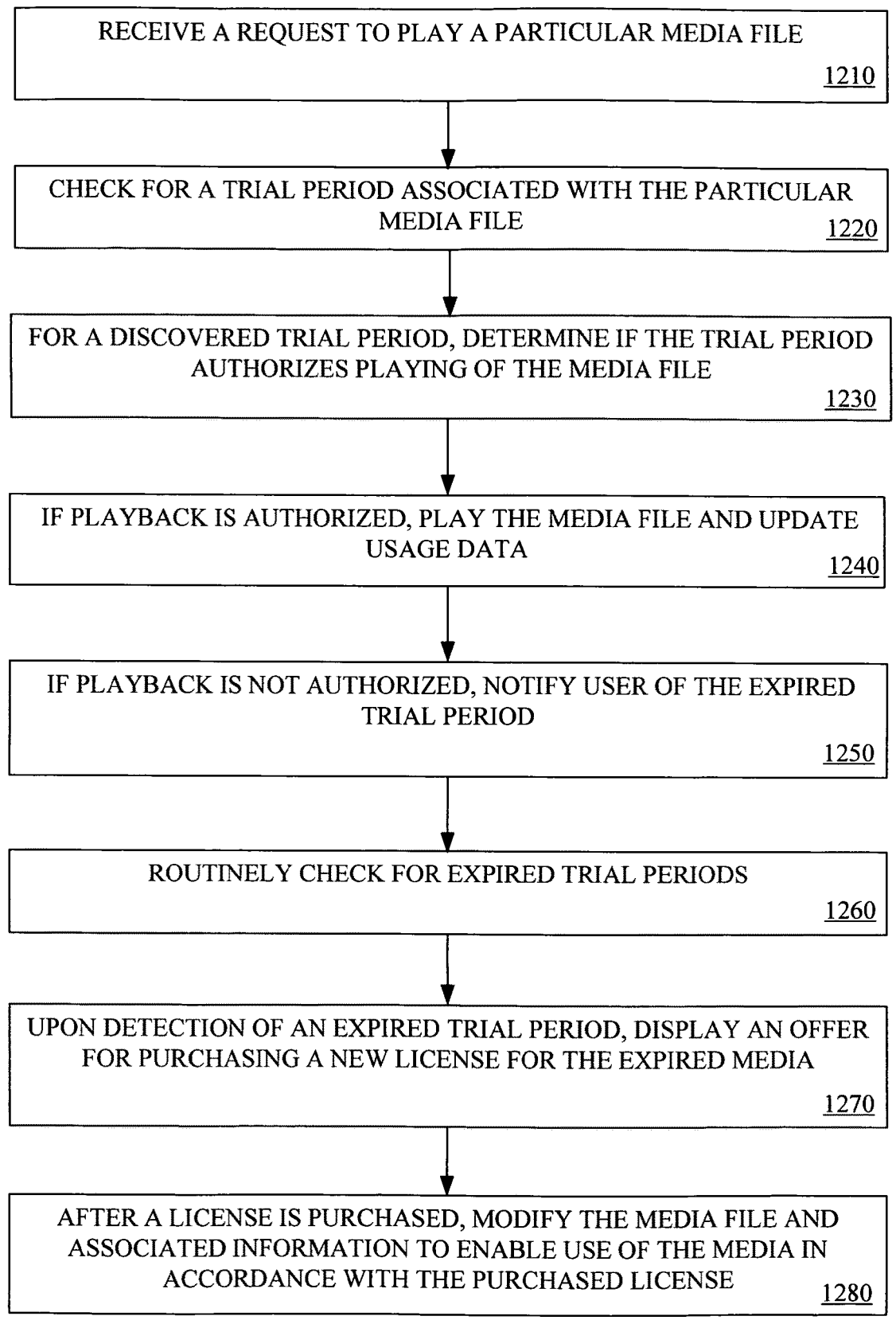
FIG. 12 is a flowchart describing one embodiment, among others, of an approach for generating an offer to purchase a media license in accordance with the system of FIG. 1.

In a case where a user has a media player application 110 stored on a general-purpose computer 130 (or other communication device) that communicates with a media server 120, one embodiment, among others, of an approach for generating an offer to purchase a media license is represented in the flowchart of FIG. 12. In this example, the media player application 110 receives (1210) a request to play a particular media file. In response, the media player application 110 checks (1220) for a trial period associated with the particular media file. If the media player application 110 does not find an associated trial period, the media player application 110 proceeds to play the media file. However, if the media player application 110 does find an associated trial period, the media player application 110 determines (1230) if the trial period has not expired and authorizes playing of the media file. If the trial period has not expired and the media file is authorized to be played, then the media file is played (1240) and usage data is updated, if warranted, by the player 110 or reported to the media sharing application 160, so that it may update the necessary files.

The media player, in some embodiments, notifies (1250) the user of the expired trial period via an audible media or message. In other embodiments, the media player application 110 may display a visual message or icon denoting the expiration of the trial period or usage. Also, the media sharing application 160 routinely checks (1260) for expired trial periods (e.g., at launching of the media sharing application 160, after logging into media server 120, etc.) and upon detection of an expired limitation, displays (1270) an offer screen interface for purchasing a new license for the expired media. The offer screen interface may provide a variety of different licensing options (e.g., purchasing media for unlimited duration, purchasing extended use of media for limited duration, purchasing use of media for unlimited playbacks, purchasing for limited playbacks, etc., as generally demonstrated in FIG. 11) and prompts the user to select an option and to provide information for purchasing one of the options. Further, information provided by the user is relayed to the media server 120 (e.g. by media sharing application, other computer application, etc.), and information provided by the media server 120 is relayed to the user via the media sharing application 160. After a license is purchased, then modifications, as necessary, are made (1280) to the media file and associated usage data to enable use of the media file in accordance with the purchased license. For example, parameters may be added or modified to a header of a media file to indicate that the media file is subject to a new trial period or is subject to a new licensing agreement that authorizes unlimited use of the media file.

Figure 13:
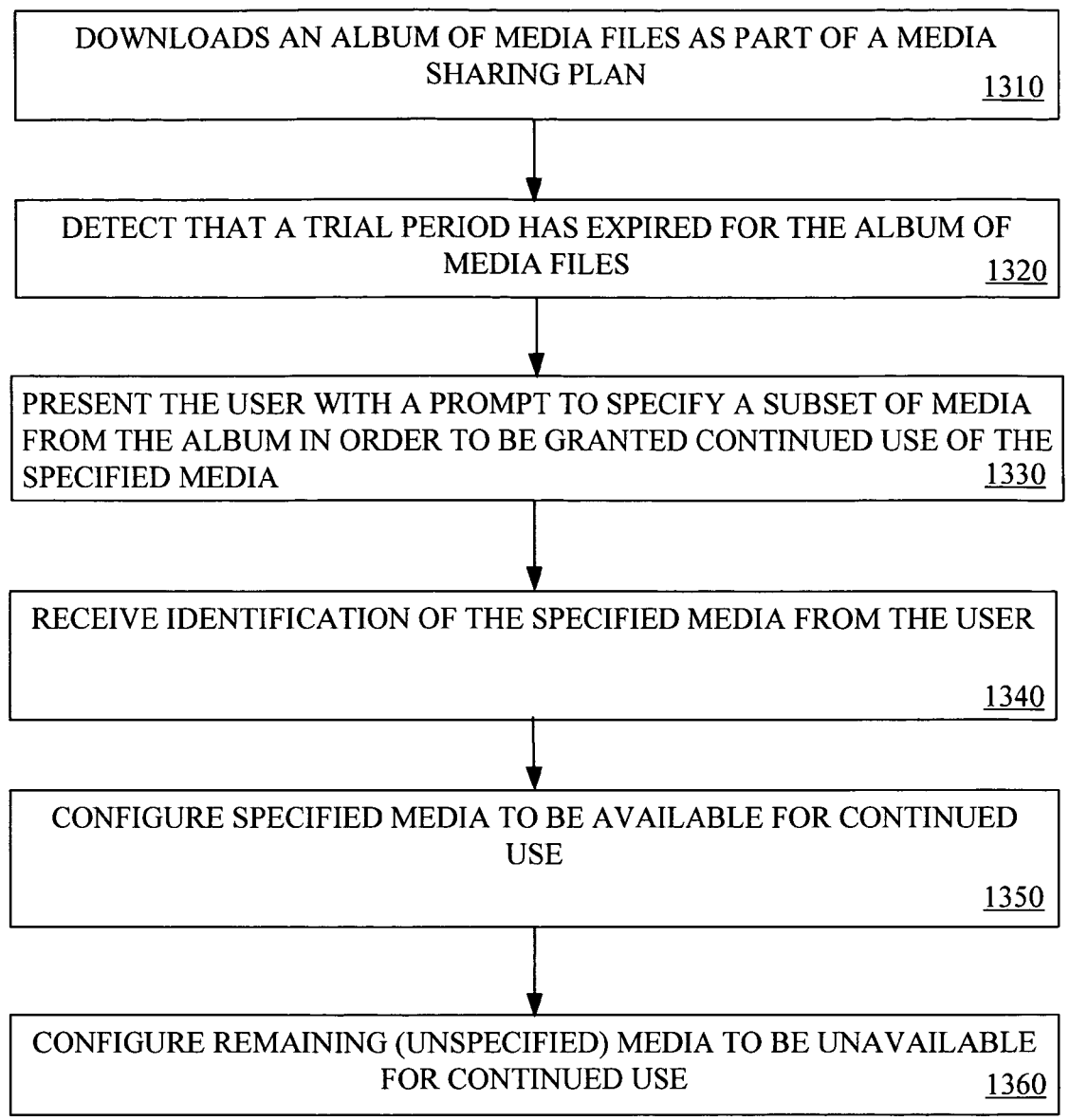
FIG. 13 is a flowchart describing one embodiment, among others, of a license offering process in accordance with the system of FIG. 1.

Referring now to FIG. 13, one embodiment of a license offering process is described. The process begins in step 1310 in which a user downloads an album or collection of media files from the media server 120 as part of a media sharing plan. For example, a user may subscribe to a particular media sharing plan or service that authorizes the user to download an album of songs (as embodied in media files) each month for a monetary fee. For instance, a user may choose to download all the songs from a particular Frank Sinatra album or collection, where there may generally be 12 songs on the album. As part of the media sharing plan, the user is authorized to download and play the media for one month's time. However, after the one month's time is over and the trial period has expired, the user is to be prohibited from playing and accessing the downloaded media except for a specified number of media. The point at which the user is prohibited from accessing the downloaded media may differ in different embodiments. In some embodiments, a user may be prohibited after the trial period has expired and the user logs into the media server 120. In other embodiments, the user may be prohibited after the trial period has expired and the user requests playback of the expired media. In other embodiments, a different event may trigger the point at which access to the expired media is prohibited.

For example, the user may be authorized to select two media from the collection of media (e.g., media files) to keep for continued use. Therefore, in this scenario, after the trial period has expired (1320) for the collection of media, the user is presented (1330) with a prompt to specify two media (or some other subset) from the album and then be granted continued use of the specified media. After the user specifies the media (e.g., via a screen interface), the media sharing service receives (1340) identification of the specified media from the user. In some embodiments, a field within a header of the specified media may then be configured (1350) or modified (e.g., by a computer application after receiving instruction from the media sharing service) to indicate that the media file is not subject to a trial period and is available for continued use. Alternatively, an encryption/decryption key for the media may not be deleted upon detection of the expired trial period or the media file(s) will be reformatted and a new encryption/decryption key is provided. For the remaining media files that are not authorized to be accessed according to the terms of the media sharing plan, the remaining media are configured (1360) to not be accessible by the user.

For example, in some embodiments, the media sharing plan may authorize three albums to be downloaded in a month's time and these three albums are each associated with one encryption/decryption key. After the month's time elapses, however, the specified media from each album are assigned new encryption/decryption keys and the previous key is deleted to prevent access to the expired media files. In some embodiments, a month's time may elapse and a user is still authorized to access media on an album, until the user logs into the media server 120. At this time, the media server 120 checks whether an album has expired and then prompts the user to specify media that the user would like to keep and deactivates the rest. For example, the remaining media for the album may be deleted, or modified to indicate that use of the media file is not authorized, or have associated files (e.g., encryption/decryption key) deleted and/or modified to prevent access to the respective media files. In this way, a user is granted an opportunity to listen to a whole collection of media for a limited duration and then choose to keep his or her favorite media from the collection for continued use. In some embodiments, the user may also have the option of purchasing new licensing agreements for the remaining media in the collection also.

Further, in some embodiments, a media sharing plan may authorize a certain quantity of albums to be downloaded in a month's time, where use of media from the albums is authorized for a particular time period. After the particular time period has elapsed, a user is then offered to purchase one or more licenses for continued use of one or more media from the downloaded albums. Further, as inducement for purchasing licenses for individual media, the user may be granted an additional time period for usage of media from the downloaded albums, if a particular number of licenses are purchased. For example, in return for purchasing licenses for 5 songs, the trial period for accessing the remaining songs from the downloaded albums is extended.

Embodiments of the present disclosure can be implemented in software (e.g., firmware), hardware, or a combination thereof. For example, in some embodiments, the media player application 110 and media sharing application 160 are implemented in software, as an executable program, and is executed by a special or general-purpose digital computer, such as a personal computer (PC; IBM-compatible, Apple-compatible, or otherwise), workstation, minicomputer, or mainframe computer. An example of a general-purpose computer that can implement various components of present disclosure is shown in FIG. 14.

Figure 14:
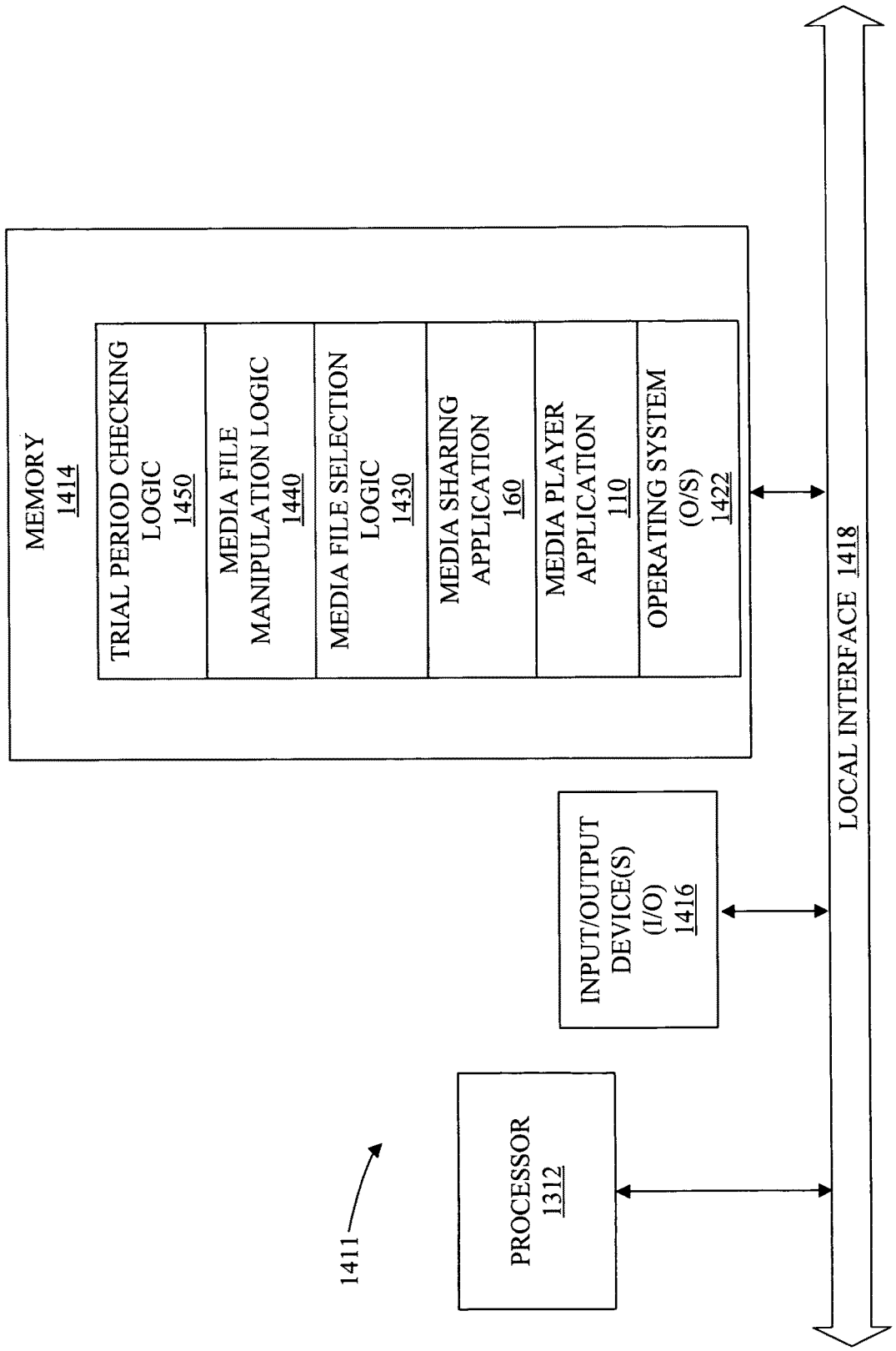
FIG. 14 is a block diagram of a general-purpose computer that can implement various components of present disclosure in accordance with the system of FIG. 1.

Generally, in terms of hardware architecture, as shown in FIG. 14, the computer 1411 includes a processor 1412, memory 1414, and one or more input and/or output (I/O) devices 1416 (or peripherals) that are communicatively coupled via a local interface 1418. The local interface 1418 can be, for example but not limited to, one or more buses or other wired or wireless connections, as is known in the art. The local interface 1418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1412 is a hardware device for executing software, particularly that stored in memory 1414. The processor 1412 can be any custom made or commercially available processor, a central processing unit (CPU), an auxiliary processor among several processors associated with the computer 11, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80.times.86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 1414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1414 may incorporate electronic, magnetic, optical, and/or other types of storage media. Note that the memory 1414 can have a distributed architecture, where various components are situated remote from one another, but can be accessed by the processor 1412.

The software in memory 1414 may include one or more separate programs, each of which comprises an ordered listing of executable instructions for implementing logical functions. In the example of FIG. 14, the software in the memory 1414 includes a media player application 110, a media sharing application 160, media file selection logic 1430 configured to prompt a user to select a subset of media files from the collection of media files that was downloaded from the media server 120 after the trial period is detected to have expired, media file manipulation logic 1440 configured to modify the selected media files to be subject to unlimited use by the user and the remaining media files to be inaccessible by the user, and trial period checking logic 1450 configured to check a media file previously downloaded from the file server for an expired trial period, in accordance with the present disclosure, and a suitable operating system (O/S) 1422. A nonexhaustive list of examples of suitable commercially available operating systems 1422 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 1422 essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When a source program, then the program is translated via a compiler, assembler, interpreter, or the like, which may or may not be included within the memory 1414, so as to operate properly in connection with the O/S 1422.

The I/O devices 1416 may include input devices, for example but not limited to, a keyboard, mouse, scanner, microphone, etc. Furthermore, the I/O devices 1416 may also include output devices, for example but not limited to, a printer, display, etc. Finally, the I/O devices 1416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 1411 is a PC, workstation, or the like, the software in the memory 1414 may further include a basic input output system (BIOS) (omitted for simplicity). The BIOS is a set of essential software routines that initialize and test hardware at startup, start the O/S 1422, and support the transfer of data among the hardware devices. The BIOS is stored in ROM so that the BIOS can be executed when the computer 1411 is activated.

When the computer 1411 is in operation, the processor 1412 is configured to execute software stored within the memory 1414, to communicate data to and from the memory 1414, and to generally control operations of the computer 1411 pursuant to the software. Software in memory, in whole or in part, are read by the processor 1412, perhaps buffered within the processor 1412, and then executed.

It should be noted that the software components can be stored on any computer readable medium for use by or in connection with any computer related system or method. In the context of this document, a computer readable medium is an electronic, magnetic, optical, or other physical device or means that can contain or store a computer program for use by or in connection with a computer related system or method. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

If implemented in hardware, as in an alternative embodiment, various embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure.

For example, as noted above, the invention is not limited to sharing of any specific type of digital media files. The principles of the present disclosure may be extended to any form of digital media, including audiovisual files. To illustrate, in some embodiments, a media video file may be subject to trial access terms, such that after expiration of the trial access terms, limited use of the media video file is authorized. In particular, after expiration of trial access terms for the media video file, the video portion of the media video file may be prohibited from being played by a media player application, while the audio portion is allowed to be played or vice versa.

All such modifications and variations are intended to be included herein within the scope of this disclosure.

What is claimed is:

1. A system comprising:
a processor; and
a memory that stores executable instructions that, when executed by the processor, facilitate performance of operations, comprising:
receiving, over a network from a file server, a file structure including a collection of media files and trial access terms, wherein the collection of media files are subject to a trial period according to the trial access terms;
receiving a first encryption/decryption key from the file server;
receiving a second encryption/decryption key from the file server;
transmitting the second encryption/decryption key to a portable communication device to enable access to the collection of media files at the portable communication device;
decrypting an encryption layer of the file structure according to the first encryption/decryption key to facilitate access to the collection of media files and trial access terms;
responsive to the decrypting the encryption layer of the file structure:
receiving a selection of a subset of media files from the collection of media files that was downloaded from the file server to define a set of selected media files, wherein the selection is based on user input;
detecting a first expiration of the trial period upon activation of a media sharing application;
responsive to the detecting the first expiration of the trial period, accessing a first header of a first media file of the set of selected media files;
determining, from the first header of the first media file, a quantity of digital tokens required to maintain access to the set of selected media files after the detecting the first expiration of the trial period;
determining availability of the quantity of digital tokens required to maintain access to the set of selected media files;
responsive to determining that the quantity of digital tokens required to maintain access is available, exchanging the quantity of digital tokens with the file server to maintain access; and
responsive to determining that the quantity of digital tokens is not available, providing a prompt to purchase additional tokens to maintain access;
determining a second expiration of the trial period for access to the collection of media files at the portable communication device, wherein the determining the second expiration of the trial period for access to the collection of media files at the portable communication device is responsive to connecting the the portable communication device; and
presenting a second prompt to purchase additional tokens to reestablish access to the collection of media files at the portable communication device.

2. The system of claim 1, wherein the operations further comprise:
accessing a second header of a second media file of the collection of media files; and
determining the trial period from the second header of the second media file.

3. The system of claim 2, wherein the detecting the first expiration of the trial period further comprises comparing the trial period determined from the second header of the second media file with usage data associated with the second media file.

4. The system of claim 3, wherein the operations further comprise updating the second header of the second media file to include the usage data associated with the second media file.

5. The system of claim 1, wherein the operations further comprise modifying at least a subset of media files of the collection of media files to be subject to unlimited use by a user and a remaining set of media files of the collection of media files to be inaccessible by the user.

6. The system of claim 1, wherein the operations further comprise transmitting the file structure including the collection of media files and the trial access terms to the portable communication device.

7. The system of claim 1, wherein the trial period is expressed in terms of an amount of time, amount of usage of the collection of media files, or a combination thereof.

8. A method comprising:
downloading, by a processing system including a processor, a file structure, over a network from a file server, including a collection of media files and trial access terms, wherein the collection of media files are subject to a trial period according to the trial access terms;
receiving, by the processing system, a first encryption/decryption key from the file server;
receiving, by the processing system, a second encryption/decryption key from the file server;
transmitting, by the processing system, the second encryption/decryption key to a portable communication device to enable access to the collection of media files at the portable communication device;
decrypting, by the processing system, an encryption layer of the file structure according to the first encryption/decryption key to facilitate access to the collection of media files and trial access terms;
responsive to the decrypting the encryption layer of the file structure:
detecting, by the processing system, a first expiration of the trial period, wherein the trial period is detected to have expired upon activation of a media sharing application;
prompting, by the processing system, a user to select a subset of media files from the collection of media files to define a set of selected media files after detection of the first expiration of the trial period;
accessing, by the processing system, a first header of a first media file of the set of selected media files;
determining, by the processing system, a quantity of digital tokens required to maintain access to the set of selected media files from the first header of the first media file after the detecting the first expiration of the trial period;
determining, by the processing system, availability of the quantity of digital tokens required to maintain access to the set of selected media files;
responsive to determining that the quantity of digital tokens required to maintain access is available, exchanging, by the processing system, the quantity of digital tokens with the file server to maintain access; and
responsive to determining that the quantity of digital tokens is not available, providing, by the processing system, a prompt to purchase additional tokens to maintain access;
determining, by the processing system, a second expiration of the trial period for access to the collection of media files at the portable communication device, wherein the determining the second expiration of the trial period for access to the collection of media files at the portable communication device is responsive to connecting to the portable communication device; and
presenting, by the processing system, a second prompt to purchase additional tokens to reestablish access to the collection of media files at the portable communication device.

9. The method of claim 8, further comprising:
accessing, by the processing system, a second header of a second media file of the collection of media files; and
determining, by the processing system, the trial period from the second header of the second media file.

10. The method of claim 9, wherein the detecting the first expiration of the trial period further comprises comparing, by the processing system, the trial period determined from the second header of the second media file with usage data associated with the second media file.

11. The method of claim 10, further comprising storing, by the processing system, the usage data associated with the second media file at a file associated with the second media file.

12. The method of claim 10, further comprising:
storing, by the processing system, at a data file associated with the second media file, the usage data associated with the second media file.

13. The method of claim 12, wherein a plurality of usage data associated with a plurality of media files of the collection of media files are stored at the data file associated with the second media file.

14. The method of claim 8, wherein the detecting the first expiration of the trial period is triggered by logging into the file server after the trial period has expired.

15. The method of claim 8, wherein the detecting the first expiration of the trial period is triggered by an access request to a media file from the collection of media files.

16. A non-transitory computer readable medium comprising instructions that when executed by a processor cause the processor to perform operations comprising:
receiving, over a network from a file server, a file structure including a collection of media files and trial access terms, wherein the collection of media files are subject to a trial period according to the trial access terms;
receiving a first encryption/decryption key from the file server;
receiving a second encryption/decryption key from the file server;
transmitting the second encryption/decryption key to a portable communication device to enable access to the collection of media files at the portable communication device;
decrypting an encryption layer of the file structure according to the first encryption/decryption key to facilitate access to the collection of media files and trial access terms; and
responsive to the decrypting the encryption layer of the file structure:
receiving a selection of a subset of media files from the collection of media files that was downloaded from the file server after a first expiration of the trial period is detected to define a set of selected media files, the selection of the subset of media files being based on user input, wherein the first expiration of the trial period is detected upon activation of a media sharing application;
accessing a first header of a first media file of the set of selected media files;
determining a quantity of digital tokens required to maintain access to the set of selected media files from the first header of the first media file after the first expiration of the trial period is detected;
determining availability of the quantity of digital tokens required to maintain access to the set of selected media files;

responsive to determining that the quantity of digital tokens required to maintain access is available, exchanging the quantity of digital tokens with the file server to maintain access; and responsive to determining that the quantity of digital tokens is not available, providing a prompt to purchase additional tokens to maintain access;

determining a second expiration of the trial period for access to the collection of media files at the portable communication device, wherein the determining the second expiration of the trial period for access to the collection of media files at the portable communication device is responsive to connecting to the portable communication device; and presenting a second prompt to purchase additional tokens to reestablish access to the collection of media files at the portable communication device.

17. The non-transitory computer readable medium of claim 16, wherein the operations further comprise:

accessing a second header of a second media file of the collection of media files; and determining the trial period from the second header of the second media file.

18. The non-transitory computer readable medium of claim 17, wherein first expiration of the trial period comprises comparing the trial period determined from the second header of the second media file with usage data associated with the second media file.

19. The non-transitory computer readable medium of claim 18, wherein the operations further comprise storing the usage data associated with the second media file at a file associated with the second media file.

* * * * *